US010922131B2

(12) United States Patent
Bai

(10) Patent No.: US 10,922,131 B2
(45) Date of Patent: Feb. 16, 2021

(54) APPLICATION FUNCTION CONTROL METHOD AND RELATED PRODUCT

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/616,936

(22) PCT Filed: May 10, 2018

(86) PCT No.: PCT/CN2018/086368
§ 371 (c)(1),
(2) Date: Nov. 25, 2019

(87) PCT Pub. No.: WO2018/219119
PCT Pub. Date: Dec. 6, 2018

(65) Prior Publication Data
US 2020/0264918 A1 Aug. 20, 2020

(30) Foreign Application Priority Data
May 27, 2017 (CN) .......................... 2017 1 0387987

(51) Int. Cl.
*G06F 9/48* (2006.01)
*G06N 20/00* (2019.01)
(Continued)

(52) U.S. Cl.
CPC ............ *G06F 9/4843* (2013.01); *G06F 9/451* (2018.02); *G06F 9/54* (2013.01); *G06F 9/541* (2013.01); *G06N 20/00* (2019.01)

(58) Field of Classification Search
CPC ........ G06F 9/541; G06F 9/54; G06F 9/44542; G06F 9/44594; G06F 9/44521
See application file for complete search history.

(56) References Cited

U.S. PATENT DOCUMENTS

2008/0126764 A1* 5/2008 Wu ......................... G06F 9/466
712/226
2009/0307676 A1* 12/2009 Price ................... G06F 9/44557
717/162
(Continued)

FOREIGN PATENT DOCUMENTS

CN 104182231 A 12/2014
CN 105159689 A 12/2015
(Continued)

OTHER PUBLICATIONS

International Search Report for Application No. PCT/CN2018/086368, dated Aug. 1, 2018.
(Continued)

*Primary Examiner* — Brian W Wathen
(74) *Attorney, Agent, or Firm* — Ladas & Parry LLP

(57) ABSTRACT

The embodiments of the present disclosure provide an application function control method and a related product. The method includes: generating in response to detecting a starting instruction for a first application, a first instruction containing an application identifier of the first application; generating in response to finding out according to the first instruction that the disabled function set includes at least one first function of the first application, a second instruction containing a function identifier of the at least one first function and running according to the second instruction one or more functions, except the at least one first function, in multiple functions of the first application.

20 Claims, 5 Drawing Sheets

(51) Int. Cl.
    *G06F 9/451*    (2018.01)
    *G06F 9/54*     (2006.01)

(56) References Cited

U.S. PATENT DOCUMENTS

| | | |
|---|---|---|
| 2014/0235228 A1 | 8/2014 | Hirako et al. |
| 2015/0128070 A1 | 5/2015 | Lee et al. |
| 2016/0357531 A1* | 12/2016 | Trofin ................... G06F 8/443 |
| 2016/0357536 A1* | 12/2016 | Firlik ..................... G06F 9/54 |

FOREIGN PATENT DOCUMENTS

| | | | |
|---|---|---|---|
| CN | 106055408 A | 10/2016 | |
| CN | 106406892 A | 2/2017 | |
| CN | 106411938 A | 2/2017 | |
| CN | 106445664 A | 2/2017 | |
| CN | 106648902 A | 5/2017 | |
| CN | 106708513 A | 5/2017 | |
| CN | 106713608 A | 5/2017 | |
| CN | 107302628 A | 10/2017 | |
| EP | 2051157 A1 | 4/2009 | |
| EP | 2869181 A1 | 5/2015 | |

OTHER PUBLICATIONS

Third Chinese Office Action for Application No. CN 201710387987.0, dated Sep. 24, 2019.
The extended European search report for EP patent application No. 18810571.2, dated Feb. 28, 2020.

\* cited by examiner

APPLICATION FUNCTION CONTROL METHOD AND RELATED PRODUCT

CROSS-REFERENCE TO RELATED APPLICATIONS

The present application is a national stage application of International Patent Application No. PCT/CN2018/086368, which was filed on May 10, 2018 and claims priority to Invention Patent Application No. 201710387987.0, submitted to the State Intellectual Property Office of China on 2017 May 27 and entitled "Application Function Control Method and Related Product".

TECHNICAL FIELD

The present disclosure relates to the technical field of mobile terminals, and more particularly to an application function control method and a related product.

BACKGROUND

Along with rapid development of microelectronic technologies, functions of smart phones have become increasingly powerful and, by installing various third-party applications and pre-installing various applications in operating systems of smart phones, smart phones have been able to realize various functions of video playing, payment, gaming and the like, except basic communication functions.

At present, applications of a smart phone are developed to have full functions, namely a single application usually includes multiple functions, and functions of each application are fixed. However, when a user practically uses an application, many functions are usually hardly used.

SUMMARY

Embodiments of the present disclosure provide an application function control method and a related product, which can implement "Application thinning", and can facilitate the improvement in utilization efficiency of processing resources of a mobile terminal and reduction in power consumption.

According to a first aspect, the embodiments of the present disclosure provide a mobile terminal, which includes a processor and an Artificial Intelligence (AI) module, the processor being coupled to the AI module, wherein the processor is configured to, in response to detecting a starting instruction for a first application, send a first instruction containing an application identifier of the first application to the AI module;

the AI module is configured to receive the first instruction and, in response to finding out that a disabled function set includes at least one first function of the first application, send a second instruction containing a function identifier of the at least one first function to the processor; and the processor is further configured to receive the second instruction and run one or more functions, except the at least one first function, in multiple functions of the first application.

According to a second aspect, the embodiments of the present disclosure provide an application function control method, which is applied to a mobile terminal including a processor and an AI module and includes that:

the mobile terminal controls the processor to, in response to detecting a starting instruction for a first application, send a first instruction containing an application identifier of the first application to the AI module;

the mobile terminal controls the AI module to receive the first instruction and, in response to finding out that a disabled function set includes at least one first function of the first application, send a second instruction containing a function identifier of the at least one first function to the processor; and the mobile terminal controls the processor to receive the second instruction and run one or more functions, except the at least one first function, in multiple functions of the first application.

According to a third aspect, the embodiments of the present disclosure provide a mobile terminal, which has a function of implementing operations of the mobile terminal in the method embodiments. The function may be realized through hardware, and may also be realized by executing corresponding software through the hardware. The hardware or the software includes one or more modules corresponding to the function.

According to a fourth aspect, the embodiments of the present disclosure provide a mobile terminal, which includes one or more processors, an AI module, a memory, a communication interface and one or more programs. The one or more programs are stored in the memory and configured to be executed by the one or more processors and the AI module. The one or more programs include instructions configured to execute the operations in any method in the second aspect of the embodiments of the present disclosure.

According to a fifth aspect, the embodiments of the present disclosure provide a computer-readable storage medium, which stores a computer program configured for electronic data exchange, the computer program enabling a computer to execute part or all of the operations described in any method in the second aspect of the embodiments of the present disclosure. The computer may include a mobile terminal.

According to a sixth aspect, the embodiments of the present disclosure provide a computer program product, which includes a non-transitory computer-readable storage medium including a computer program. The computer program can be operated to enable a computer to execute part or all of the operations described in any method in the second aspect of the embodiments of the present disclosure. The computer program product may be a software installation package. The computer may include a mobile terminal.

In the embodiments of the present disclosure, a processor of a mobile terminal, in response to detecting a starting instruction for a first application, sends a first instruction containing an application identifier of the first application to the AI module, then the AI module of the mobile terminal receives the first instruction and, in response to finding out that a disabled function set includes at least one first function of the first application, sends a second instruction containing a function identifier of the at least one first function to the processor, and finally, the processor of the mobile terminal receives the second instruction and runs one or more functions, except the at least one first function, in the multiple functions of the first application. Since the mobile terminal, when finally running the first application, only runs one or more functions, except the at least one first function, in the multiple functions of the first application, consumption in additional processing resources for running the at least one first function not required to be used by a user is avoided, "application thinning" is implemented, and improvement in utilization efficiency of processing resources of the mobile terminal and reduction in power consumption are facilitated.

BRIEF DESCRIPTION OF THE DRAWINGS

In order to describe the technical solutions in the embodiments of the present disclosure or in the related art more clearly, the drawings required by describing the embodiments or the related art will be simply introduced below. It is apparent that the drawings described below are related to only some embodiments of the present disclosure. Those of ordinary skill in the art may also obtain other drawings according to these drawings without creative work.

DETAILED DESCRIPTION OF THE EMBODIMENTS

Figure 1:
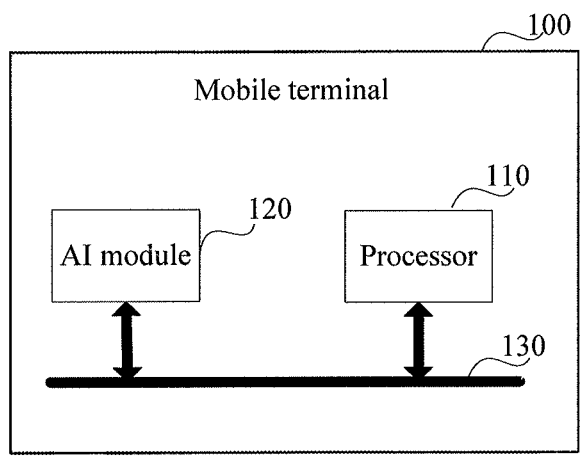
FIG. 1 is a structure diagram of a mobile terminal according to an embodiment of the present disclosure.

In order to make the solutions of the present disclosure better understood by those skilled in the art, the technical solutions in the embodiments of the present disclosure will be clearly and completely described below in combination with the drawings in the embodiments of the present disclosure. It is apparent that the described embodiments are not all embodiments but only part of embodiments of the present disclosure. Other embodiments that can be obtained by those of ordinary skill in the art based on the embodiments in the present disclosure without creative work shall fall within the scope of protection of the present disclosure.

Terms "first", "second" and the like in the specification, claims and drawings of the present disclosure are adopted not to describe a specific sequence but to distinguish different objects. In addition, terms "include" and "have" and any transformation thereof are intended to cover nonexclusive inclusions. For example, a process, method, system, product or device including a series of operations or units is not limited to the listed operations or units, but may optionally further include operations or units that are not listed, or optionally may further include other operations or units intrinsic to the process, the method, the product or the device.

"Embodiment" mentioned in the present disclosure means that an exemplary characteristic, structure or property described in combination with the embodiment may be included in at least one embodiment of the present disclosure. Appearance of this phrase at each position in the specification may not refer to the same embodiment as well as an independent or alternative embodiment mutually exclusive with the other embodiments. Those skilled in the art explicitly and implicitly understand that the embodiments described in the present disclosure may be combined with the other embodiments.

A mobile terminal involved in the embodiments of the present disclosure may include various devices with a wireless communication function, such as handheld devices, vehicle-mounted devices, wearable devices, computing devices or other processing devices coupled to modems, User Equipment (UE), Mobile Stations (MSs), terminal devices and the like in various forms. For convenient description, the devices mentioned above are collectively referred to as mobile terminals.

A processor described in the embodiments of the present disclosure may be an application processor. A form of an AI module may be hardware and/or software. When the AI module adopts the hardware form, the application processor and the AI module may be integrated and may also be separated, which will not be limited herein.

When the AI module and the application processor are integrated, if the application processor is a single-core processor, the AI module may be an intelligent microprocessor circuit in the application processor; and if the application processor is a multi-core processor, the AI module may be a single intelligent microprocessor core in the multi-core processor or an intelligent microprocessor circuit in a certain microprocessor core of the multi-core processor.

When the AI module and the application processor are separated, the AI module may be an intelligent microprocessor circuit in any coprocessor (for example, a baseband processor, a Digital Signal Processor (DSP) and a power management chip), except the application processor, in an application processor platform architecture; or, may be a newly deployed intelligent microprocessor, except the application processor, in the application processor platform architecture; or, may be a newly deployed intelligent processing platform independent of an application processor platform, the intelligent processing platform at least including a dedicated intelligent processor, the intelligent processing platform being in communication connection with the application processor platform and the intelligent processing platform being optionally in device-to-device communication connection with a memory, a peripheral and the like.

The embodiments of the present disclosure will be introduced below in combination with the drawings.

Referring to FIG. 1, FIG. 1 is a structure diagram of a mobile terminal 100 according to an embodiment of the present disclosure. The mobile terminal 100 includes a processor 110 and an AI module 120. The processor 110 is coupled to the AI module 120 through a bus 130.

The processor 110 is configured to, in response to detecting a starting instruction for a first application, send a first instruction containing an application identifier of the first application to the AI module 120.

The AI module 120 is configured to receive the first instruction and, in response to finding out that a disabled function set includes at least one first function of the first application, send a second instruction containing a function identifier of the at least one first function to the processor 110.

The processor 110 is further configured to receive the second instruction and run one or more functions, except the at least one first function, in multiple functions of the first application.

In the embodiment of the present disclosure, the processor of the mobile terminal, in response to detecting the starting instruction for the first application, sends the first instruction containing the application identifier of the first application to the AI module at first, then the AI module of the mobile terminal receives the first instruction and, in response to finding out that the disabled function set includes at least one first function of the first application, sends the second instruction containing the function identifier of the at least one first function to the processor, and finally, the processor of the mobile terminal receives the second instruction and runs one or more functions, except the at least one first function, in the multiple functions of the first application. Since the mobile terminal, when finally running the first application, only runs one or more functions, except the at least one first function, in the multiple functions of the first application, consumption in additional processing resources for running the at least one first function not required to be used by a user is avoided, "application thinning" is implemented, and improvement in utilization efficiency of processing resources of the mobile terminal and reduction in power consumption are facilitated.

In a possible example, the AI module is further configured to collect statistics on using parameters of the multiple functions of the first application within a preset time period, and is configured to acquire at least one first function of which the using parameter is smaller than a preset parameter threshold value in the multiple functions of the first application, and add the at least one first function of the first application into the disabled function set.

In the example, the mobile terminal collects statistics on usage records of the user to determine one or more functions that are infrequently used or not used by the user as the at least one first function, so that the mobile terminal is not required to run the at least one first function anymore, the consumption in the additional processing resources for running the at least one first function not required to be used by the user is avoided, and improvement in the utilization efficiency of the processing resources of the mobile terminal and reduction in the power consumption are facilitated.

In a possible example, the processor is further configured to display a function setting interface, wherein the function setting interface includes a first function navigation region configured to display functions of an application, an application selection component, a function disabling component and a second function navigation region configured to display at least one disabled function. The processor is further configured to, in response to detecting that a user selects, through the application selection component, the first application, display the multiple functions of the first application in the first function navigation region and display at least one disabled function in the multiple functions of the first application in the second function navigation region. The processor is further configured to, in response to detecting that the user disables, through the Junction disabling component, at least one first function in the first function navigation region, display the at least one first function in the second function navigation region and send a third instruction containing the function identifier of the at least one first function to the AI module.

The AI module is further configured to receive the third instruction and add the at least one first function of the first application into the disabled function set.

In the example, the mobile terminal guides the user through the function setting interface to conveniently set at least one first function required to be actively disabled in the first application, so that improvement in convenience and accuracy of disabling the at least one first function of the first application by the mobile terminal can be achieved.

In a possible example, the function setting interface may further include a function enabling component.

The processor is further configured to, in response to detecting that the user selects, through the application selection component, a second application, display multiple functions of the second application in the first function navigation region and display at least one disabled function in the multiple functions of the second application in the second function navigation region, the at least one disabled function including a second function. The processor is further configured to, in response to detecting that the user enables, through the function enabling component, the second function in the first function navigation region, remove the second function displayed in the second function navigation function and send a fourth instruction containing a function identifier of the second function to the AI module.

The AI module is further configured to receive the fourth instruction and delete the second function of the second application from the disabled function set.

In the example, the mobile terminal may guide the user through the function setting interface to conveniently re-enable the disabled second function of the second application, so that improvement in convenience and accuracy of re-enabling the second function of the second application by the mobile terminal can be achieved.

In a possible example, the processor, after running the one or more functions, except the at least one first function, in the multiple functions of the first application, is further configured to display an application interface of the first application, the application interface including at least one function and the at least one function belonging to the one or more functions, except the at least one first function, in the multiple functions of the first application.

In the example, the application interface displayed by the mobile terminal after the at least one first function of the first application is disabled is a personalized application interface associated with a requirement of the user and does not include any disabled function, so that improvement in flexibility and efficiency of controlling the first application by the mobile terminal can be achieved.

Figure 2A:
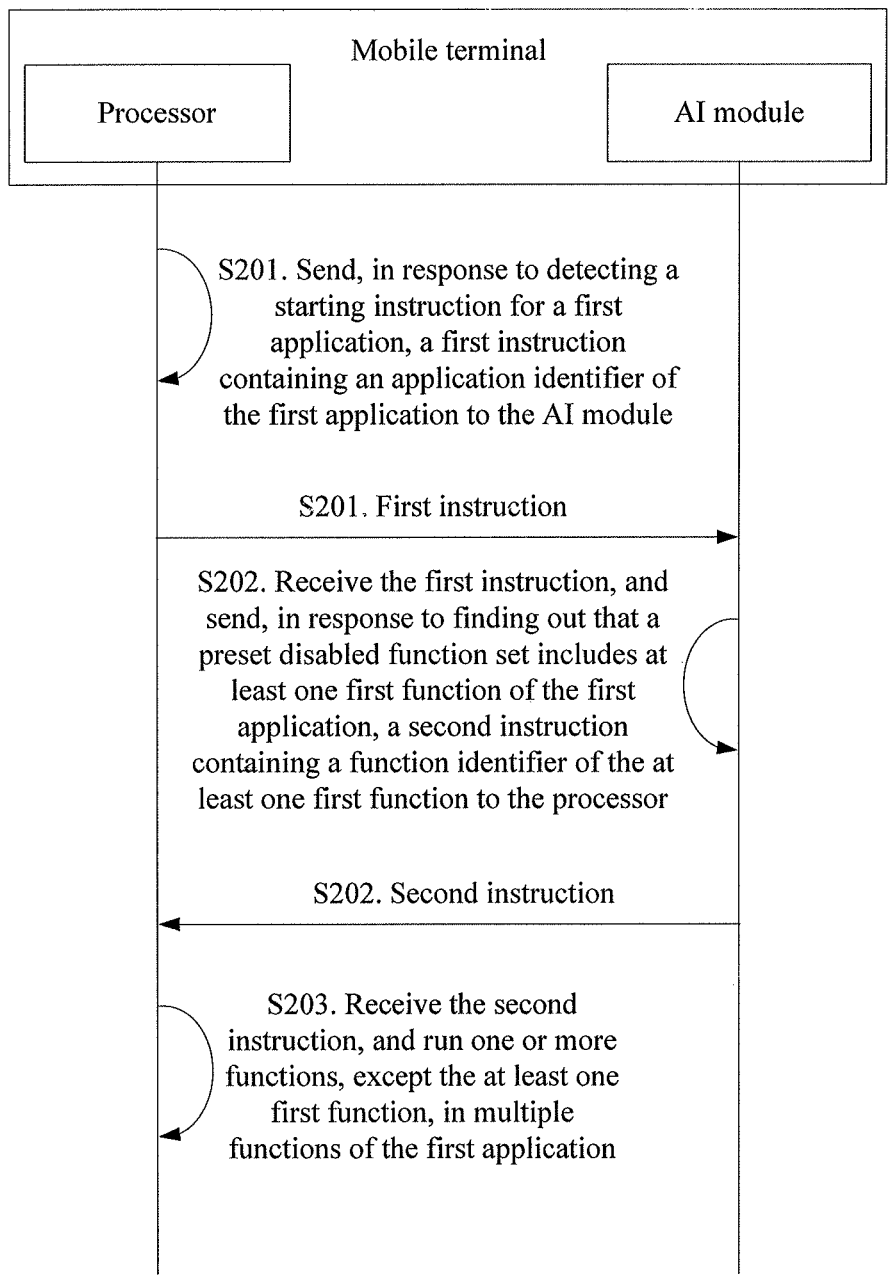
FIG. 2A is a flowchart of an application function control method according to an embodiment of the present disclosure.

Consistent with the embodiment shown in FIG. 1, referring to FIG. 2A, FIG. 2A is a flowchart of an application function control method according to an embodiment of the present disclosure. The method is applied to a mobile terminal including a processor and an AI module. The processor is coupled to the AI module. A form of the AI module may be a hardware, software or integrated hardware and software form. As shown in the figure, the application function control method includes the following operations.

In S201, the mobile terminal controls the processor to, in response to detecting a starting instruction for a first application, send a first instruction containing an application identifier of the first application to the AI module.

The first application may be a system application of the mobile terminal, for example, a weather application, a clock application or a map application. Alternatively, the first application may be a third-party application installed by a user, for example, WeChat, Alipay, QQlive or APP store. The type of the first application is not limited herein. The application identifier of the first application may be information configured to identify the first application, for example, a name and release information of the first application, which will not be limited herein.

The first instruction indicating the first application may be triggered by a selection operation of the user on an application icon of the first application, and the selection operation includes a voice operation, a touch operation and the like, which will not be limited herein.

In S202, the mobile terminal controls the AI module to receive the first instruction and, in response to finding out that a disabled function set includes at least one first function of the first application, send a second instruction containing a function identifier of the at least one first function to the processor.

The disabled function set includes at least one function to be disabled.

The at least one first function may include at least one disabled function in the first application. The at least one first function may be configured to realize certain functions, such as "card package", "Ibeacon" or "drift bottle" of WeChat and "word of mouth" of Alipay. The function identifier of the at least one first function may be information configured to identify the function, for example, function description information or a function name, which will not be limited herein.

In S203, the mobile terminal controls the processor to receive the second instruction and run one or more functions, except the at least one first function, in multiple functions of the first application.

For example, if the first application is WeChat and the at least one first function includes "card package" and "Ibeacon", the processor 110, after receiving the second instruction, is not required to run "card package" and "Ibeacon" anymore, and is only required to run other functions except the two functions.

In the embodiment of the present disclosure, the processor of the mobile terminal, in response to detecting the starting instruction for the first application, sends the first instruction containing the application identifier of the first application to the AI module at first, then the AI module of the mobile terminal receives the first instruction and, in response to finding out that the disabled function set includes at least one first function of the first application, sends the second instruction containing the function identifier of the at least one first function to the processor, and finally, the processor of the mobile terminal receives the second instruction and runs one or more functions, except the at least one first function, in the multiple functions of the first application. Since the mobile terminal, when finally running the first application, only runs one or more functions, except the at least one first function, in the multiple functions of the first application, consumption in additional processing resources for running the at least one first function not required to be used by a user is avoided, "application thinning" is implemented, and improvement in utilization efficiency of processing resources of the mobile terminal and reduction in power consumption are facilitated.

In a possible example, the method may further include that:

the mobile terminal controls the AI module to collect statistics on using parameters of the multiple functions of the first application within a preset time period; and the mobile terminal controls the AI module to acquire at least one first function of which the using parameter is smaller than a preset parameter threshold value in the multiple functions of the first application, and add the at least one first function of the first application into the disabled function set.

The using parameter may be, for example, the number of using times, a using frequency or a using duration, which will not be limited herein. The preset parameter threshold value may be set by a system or set by the user, which will not be limited herein.

In the example, the mobile terminal collects statistics on usage records of the user to determine one or more functions that are infrequently used or not used by the user as the at least one first function, so that the mobile terminal is not required to run the at least one first function anymore, the consumption in the additional processing resources for running the at least one first function not required to be used by the user is avoided, and improvement in, the utilization efficiency of the processing resources of the mobile terminal and reduction in the power consumption are facilitated.

In a possible example, the method may further include that:

the mobile terminal controls the processor to display a function setting interface, wherein the function setting interface includes a first function navigation region configured to display functions of an application, an application selection component, a function disabling component and a second function navigation region configured to display at least one disabled function.

Figure 2B:
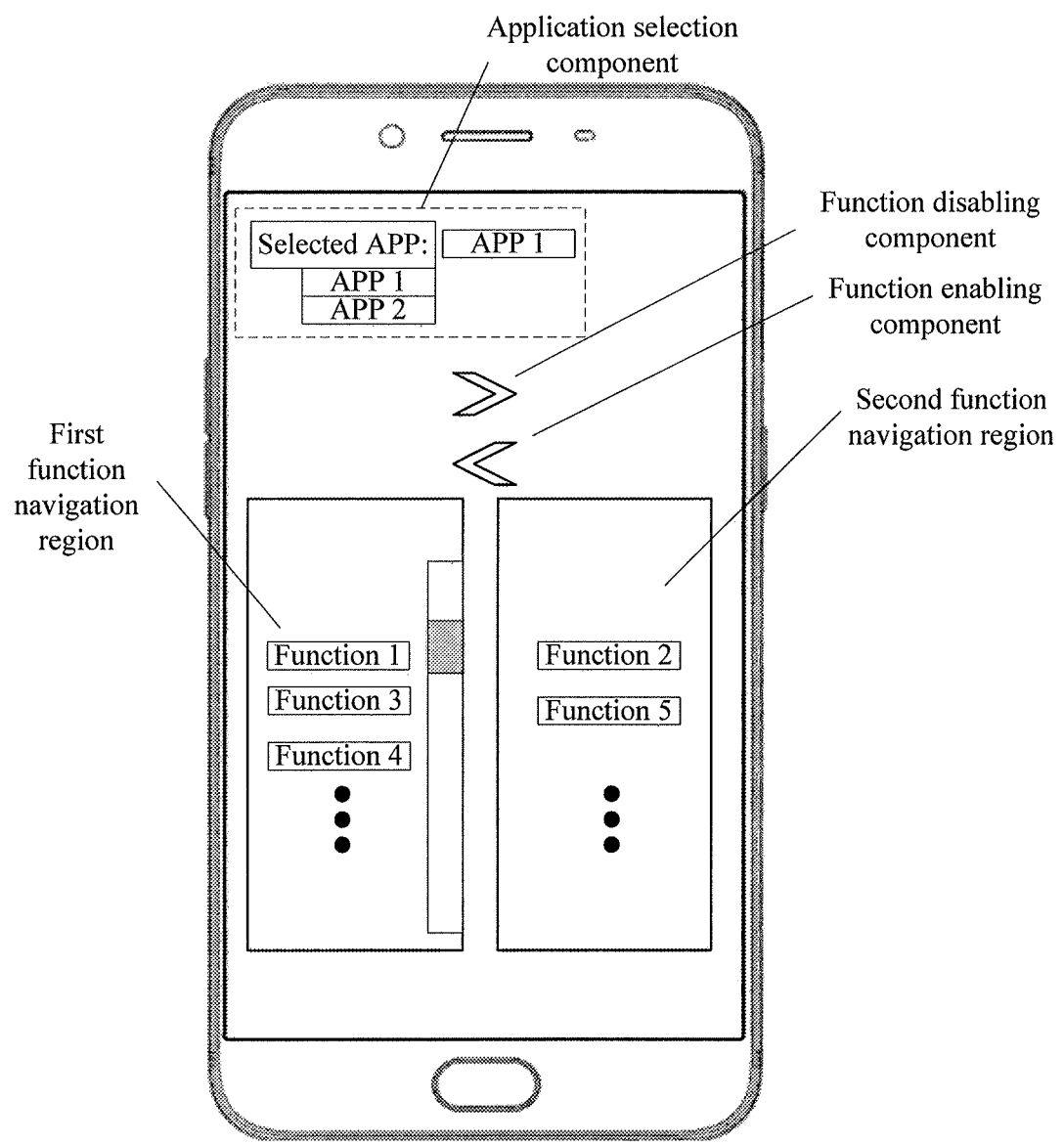
FIG. 2B is an exemplary diagram of a function setting interface according to an embodiment of the present disclosure.

As shown in FIG. 2B, the function setting interface includes the first function navigation region, the application selection component, the function disabling component and the second function navigation region configured to display the disabled function, and may further include a function enabling component. The first function navigation region may display, e.g., Function 1, Function 3, Function 4 and the like of the first application that is presently selected, and the second function navigation region may display all disabled functions such as Function 2 and Function 5 in the disabled function set. The disabled functions displayed in the second function navigation region may include different functions of different applications.

The mobile terminal controls the processor to, in response to detecting that a user selects, through the application selection component, the first application, display the multiple functions of the first application in the first function navigation region and display at least one disabled function in the multiple functions of the first application in the second function navigation region.

The mobile terminal controls the processor to, in response to detecting that the user disables, through the function disabling component, at least one first function in the first function navigation region, display the at least one first function in the second function navigation region and send a third instruction containing the function identifier of the at least one first function to the AI module.

The mobile terminal controls the AI module to receive the third instruction and add the at least one first function of the first application into the disabled function set.

In the example, the mobile terminal guides the user through the function setting interface to conveniently set the at least one first function required to be actively disabled in the first application, so that improvement in convenience and accuracy of disabling the at least one first function of the first application by the mobile terminal can be achieved.

In a possible example, the function setting interface may further include a function enabling component, and the method may further include that:

the mobile terminal controls the processor to, in response to detecting that the user selects, through the application selection component, a second application, display multiple functions of the second application in the first function navigation region and display at least one disabled function in the multiple functions of the second application in the second function navigation region, the at least one disabled function including a second function;

the mobile terminal controls the processor to, in response to detecting that the user enables, through the function enabling component, the second function in the first function navigation region, remove the second function displayed in the second function navigation function and send a fourth instruction containing a function identifier of the second function to the AI module; and the mobile terminal controls the AI module to receive the fourth instruction and delete the second function of the second application from the disabled function set.

In the example, the mobile terminal may guide the user through the function setting interface to conveniently re-enable the disabled second function of the second application, so that improvement in convenience and accuracy of re-enabling the second function of the second application by the mobile terminal can be achieved.

In a possible example, after the operation that the mobile terminal controls the processor to run the one or more functions, except the at least one first function, in the multiple functions of the first application, the method may further include that:

the mobile terminal controls the processor to display an application interface of the first application, the application interface including at least one function and the at least one function belonging to the one or more functions, except the at least one first function, in the multiple functions of the first application.

In the example, the application interface displayed by the mobile terminal after the at least one first function of the first application is disabled is a personalized application interface associated with a requirement of the user and does not include any disabled function, so that improvement in flexibility and efficiency of controlling the first application by the mobile terminal can be achieved.

Figure 3:
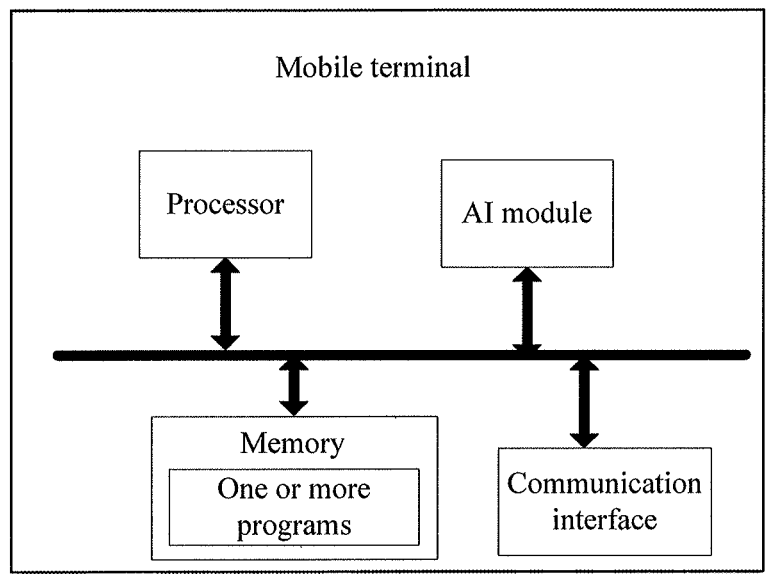
FIG. 3 is a structure diagram of a mobile terminal according to an embodiment of the present disclosure.

Consistent with the embodiment shown in FIG. 2A, referring to FIG. 3, FIG. 3 is a structure diagram of a mobile terminal according to an embodiment of the present disclosure. As shown in the figure, the mobile terminal includes one or more processors, an AI module, a memory, a communication interface and one or more programs. The one or more programs are stored in the memory and configured to be executed by the one or more processors, and the one or more programs include instructions configured to execute the following operations:

the processor is controlled to, in response to detecting a starting instruction for a first application, send a first instruction containing an application identifier of the first application to the AI module;

the AI module is controlled to receive the first instruction and, in response to finding out that a disabled function set includes at least one first function of the first application, send a second instruction containing a function identifier of the at least one first function to the processor; and the processor is controlled to receive the second instruction and run one or more functions, except the at least one first function, in multiple functions of the first application.

In the embodiments of the present disclosure, the processor of the mobile terminal, in response to detecting the starting instruction for the first application, sends the first instruction containing the application identifier of the first application to the AI module at first, then the AI module of the mobile terminal receives the first instruction and, in response to finding out that the disabled function set includes at least one first function of the first application, sends the second instruction containing the function identifier of the at least one first function to the processor, and finally, the processor of the mobile terminal receives the second instruction and runs one or more functions, except the at least one first function, in the multiple functions of the first application. Since the mobile terminal, when finally running the first application, only runs one or more functions, except the at least one first function, in the multiple functions of the first application, consumption in additional processing resources for running the at least one first function not required to be used by a user is avoided, "application thinning" is implemented, and improvement in utilization efficiency of processing resources of the mobile terminal and reduction in power consumption are facilitated.

In a possible example, the one or more programs further include instructions configured to execute the following operations: the AI module is controlled to collect statistics on using parameters of the multiple functions of the first application within a preset time period; and the AI module is controlled to acquire at least one first function of which the using parameter is smaller than a preset parameter threshold value in the multiple functions of the first application, and add the at least one first function of the first application into the disabled function set.

In a possible example, the one or more programs further include instructions configured to execute the following operations: the processor is controlled to display a function setting interface, wherein the function setting interface includes a first function navigation region configured to display functions of an application, an application selection component, a function disabling component and a second function navigation region configured to display at least one disabled function; the processor is controlled to, in response to detecting that a user selects, through the application selection component, the first application, display the multiple functions of the first application in the first function navigation region and display at least one disabled function in the multiple functions of the first application in the second function navigation region; the processor is controlled to, in response to detecting that the user disables, through the function disabling component, at least one first function in the first function navigation region, display the at least one first function in the second function navigation region and send a third instruction containing the function identifier of the at least one first function to the AI module; and the AI module is controlled to receive the third instruction, and add the at least one first function of the first application into the disabled function set.

In a possible example, the function setting interface may further include a function enabling component, and the one or more programs further include instructions configured to execute the following operations: the processor is controlled to, in response to detecting that the user selects, through the application selection component, a second application, display multiple functions of the second application in the first function navigation region and display at least one disabled function in the multiple functions of the second application in the second function navigation region, the at least one disabled function including a second function; the processor is controlled to, in response to detecting that the user enables, through the function enabling component, the second function in the first function navigation region, remove the second function displayed in the second function navigation function and send a fourth instruction containing a function identifier of the second function to the AI module; and the AI module is controlled to receive the fourth instruction and delete the second function of the second application from the disabled function set.

In a possible example, the one or more programs further include an instruction configured to execute the following operation: after the processor is controlled to run the one or more functions, except the at least one first function, in the multiple functions of the first application, the processor is controlled to display an application interface of the first application, the application interface including at least one function and the at least one function belonging to the one or more functions, except the at least one first function, in the multiple functions of the first application.

The solutions of the embodiments of the present disclosure are introduced mainly from the angle of a method execution process. It can be understood that, for realizing the functions, the mobile terminal includes corresponding hardware structures and/or software modules executing each function. Those skilled in the art may easily realize that the solution in the embodiments of the present disclosure may be implemented by hardware or a combination of the hardware and computer software based on the units and algorithm operations of each example described in the embodiments disclosed in the present disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the present disclosure.

According to the embodiments of the present disclosure, functional units of the mobile terminal may be divided according to the abovementioned method examples. For example, each functional unit may be divided correspondingly to each function and two or more than two functions may also be integrated into one and the same processing unit. The integrated unit may be implemented in a hardware form and may also be implemented in a form of software functional unit. It is to be noted that division of the units in the embodiment of the present disclosure is schematic and is only logical function division, and other division manners may be adopted during practical implementation.

Figure 4:
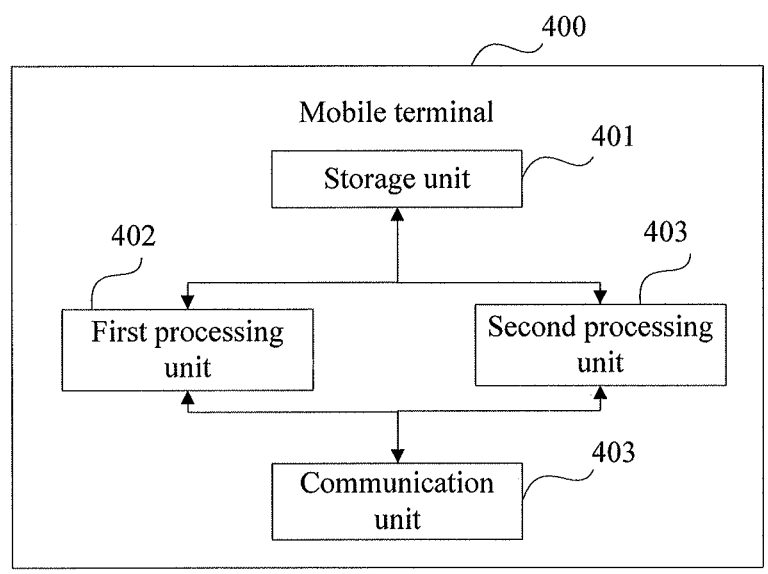
FIG. 4 is a block diagram showing the functional unit composition of a mobile terminal according to an embodiment of the present disclosure.

Under the condition of adopting the integrated unit, FIG. 4 is a possible block diagram showing the functional unit composition of a mobile terminal involved in the abovementioned embodiment. The mobile terminal 400 includes a first processing unit 402, a second processing unit 403 and a communication unit 404. The first processing unit 402 and the second processing unit 403 are configured to perform control management on operations of the mobile terminal. For example, the processing unit 402 is configured to support the mobile terminal to execute operations 201-203 in FIG. 2A and/or configured for other processes of the solution described in the present disclosure. The communication unit 404 is configured to support communication between the mobile terminal and other devices or support communication between the first processing unit 402 or the second processing unit 403 and a peripheral (for example, a photographic device and a fingerprint recognition device) of the mobile terminal. The mobile terminal may further include a storage unit 401, configured to store a program code and data of the mobile terminal.

The first processing unit 402 is configured to, in response to detecting a starting instruction for a first application, send a first instruction containing an application identifier of the first application to the second processing unit 403 through the communication unit 404.

The second processing unit 403 is configured to receive the first instruction and query whether a preset disabled function set includes a function of the first application or not, and is configured to, in response to finding out that the disabled function set includes at least one first function of the first application, send a second instruction containing a function identifier of the at least one first function to the first processing unit 402 through the communication unit 404.

The first processing unit 402 is further configured to receive the second instruction through the communication unit 404 and run one or more functions, except the at least one first function, in multiple functions of the first application.

In a possible example, the second processing unit 403 is further configured to collect statistics on using parameters of the multiple functions of the first application within a preset time period, and is configured to acquire at least one first function of which the using parameter is smaller than a preset parameter threshold value in the multiple functions of the first application, and add the at least one first function of the first application into the disabled function set.

In a possible example, the first processing unit 402 is further configured to display a function setting interface, wherein the function setting interface includes a first function navigation region configured to display functions of an application, an application selection component, a function disabling component and a second function navigation region configured to display at least one disabled function. The first processing unit 402 is configured to, in response to detecting that a user selects, through the application selection component, the first application, display the multiple functions of the first application in the first function navigation region and display at least one disabled function in the multiple functions of the first application in the second function navigation region. The first processing unit 402 is further configured to, in response to detecting that the user disables, through the function disabling component, at least one first function in the first function navigation region, display the at least one first function in the second function navigation region and send a third instruction containing the function identifier of the at least one first function to the second processing unit 403 through the communication unit 404.

The second processing unit 403 is further configured to receive the third instruction through the communication unit 404 and add the at least one first function of the first application into the disabled function set.

In a possible example, the function setting interface may further include a function enabling component, and the first processing unit 402 is further configured to, in response to detecting that the user selects, through the application selection component, a second application, display multiple functions of the second application in the first function navigation region and display at least one disabled function in the multiple functions of the second application in the second function navigation region, the at least one disabled function including a second function, and is configured to, in response to detecting that the user enables, through the function enabling component, the second function in the first function navigation region, remove the second function displayed in the second function navigation function and send a fourth instruction containing a function identifier of the second function to the second processing unit 403.

The second processing unit 403 is further configured to receive the fourth instruction through the communication unit 404, and delete the second function of the second application from the disabled function set.

In a possible example, the first processing unit 402, after running the one or more functions, except the at least one first function, in the multiple functions of the first application, is further configured to display an application interface of the first application, the application interface including at least one function and the at least one function belonging to the one or more functions, except the at least one first function, in the multiple functions of the first application.

The first processing unit 402 may be a processor or a controller, the second processing unit 403 may be an AI module. Each of the AI module and the processor may be, for example, a Central Processing Unit (CPU), a universal processor, a DSP, an Application-Specific Integrated Circuit (ASIC), a Field Programmable Gate Array (FPGA) or another programmable logical device, transistor logical device, hardware component or any combination thereof. They may implement or execute various exemplary logical blocks, modules and circuits described in combination with the contents disclosed in the present disclosure. Each of the processor and the AI module may also be a combination realizing a calculation function, for example, including a combination of one or more microprocessors and a combination of a DSP and a microprocessor. The communication unit 404 may be a transceiver, a transceiver circuit, an internal communication interface (a communication port between the processor and the peripheral) and the like. The storage unit 401 may be a memory.

An embodiment of the present disclosure also provides another mobile terminal, which includes a universal processor, configured to:

in response to detecting a starting instruction for a first application, generate a first instruction containing an application identifier of the first application;

in response to finding out according to the first instruction that a disabled function set includes at least one first function of the first application, generate a second instruction containing a function identifier of the at least one first function; and running, according to the second instruction, one or more functions, except the at least one first function, in multiple functions of the first application.

The universal processor is a processing chip with a data processing capability.

In the embodiments of the present disclosure, since the mobile terminal, when finally running the first application, only runs one or more functions, except the at least one first function, in the multiple functions of the first application, consumption in additional processing resources for running the at least one first function not required to be used by a user is avoided, "application thinning" is implemented, and improvement in utilization efficiency of processing resources of the mobile terminal and reduction in power consumption are facilitated.

In a possible example, the universal processor is further configured to collect statistics on using parameters of the multiple functions of the first application within a preset time period, and is configured to acquire at least one first function of which the using parameter is smaller than a preset parameter threshold value in the multiple functions of the first application, and add the at least one first function of the first application into the disabled function set.

In a possible example, the universal processor is further configured to display a function setting interface, wherein the function setting interface includes a first function navigation region configured to display functions of an application, an application selection component, a function disabling component and a second function navigation region configured to display at least one disabled function, is configured to, in response to detecting that a user selects, through the application selection component, the first application, display the multiple functions of the first application in the first function navigation region and display at least one disabled function in the multiple functions of the first application in the second function navigation region, is configured to, in response to detecting that the user disables, through the function disabling component, at least one first function in the first function navigation region, display the at least one first function in the second function navigation region and generate a third instruction containing the function identifier of the at least one first function, and is configured to add, through the third instruction, the at least one first function of the first application into the disabled function set.

In a possible example, the function setting interface may further include a function enabling component, and the universal processor is further configured to, in response to detecting that the user selects, through the application selection component, a second application, display multiple functions of the second application in the first function navigation region and display at least one disabled function in the multiple functions of the second application in the second function navigation region, the at least one disabled function including a second function, is configured to, in response to detecting that the user enables, through the function enabling component, the second function in the first function navigation region, remove the second function displayed in the second function navigation function and generate a fourth instruction containing a function identifier of the second function, and deletes, through the fourth instruction, the second function of the second application from the disabled function set.

In a possible example, the universal processor, after running the one or more functions, except the at least one first function, in the multiple functions of the first application, is further configured to display an application interface of the first application, the application interface including at least one function and the at least one function belonging to the one or more functions, except the at least one first function, in the multiple functions of the first application.

In a possible example, the universal processor includes an application processor and an AI module, the AI module is integrated into the application processor, and the AI module is configured to execute any operation executed by the universal processor.

In a possible example, the universal processor includes the application processor and the AI module, the AI module is arranged independent of the application processor, and the AI module is configured to execute any operation executed by the universal processor.

Figure 5:
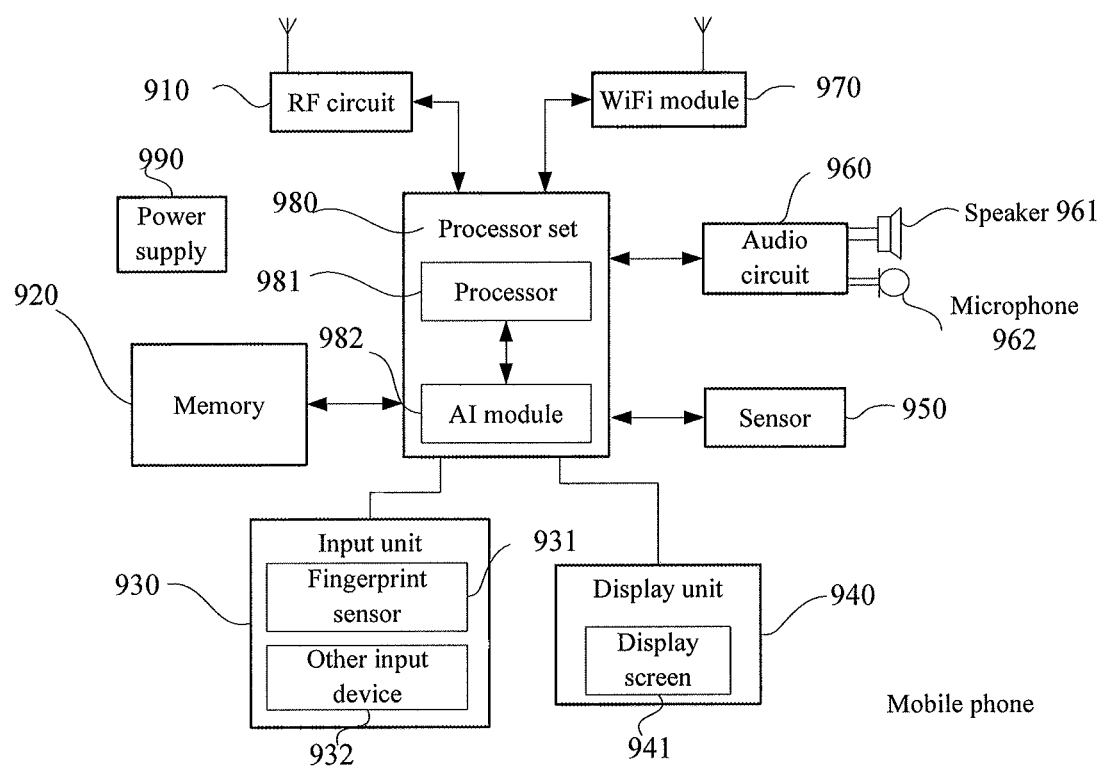
FIG. 5 is a structure diagram of another mobile terminal according to an embodiment of the present disclosure.

An embodiment of the present disclosure also provides another mobile terminal. As shown in FIG. 5, for convenient description, only parts related to the embodiment of the present disclosure are illustrated and specific technical details that are not disclosed herein refer to the parts of the method in the embodiments of the present disclosure. The mobile terminal may be any terminal device including a mobile phone, a Personal Digital Assistant (PDA), a Point of Sales (PQS), a vehicle-mounted computer and the like. For example, the mobile terminal is a mobile phone.

FIG. 5 is a block diagram showing the structure of a part of a mobile phone related to a mobile terminal according to an embodiment of the present disclosure. Referring to FIG. 5, the mobile phone includes components such as a Radio Frequency (RF) circuit 910, a memory 920, an input unit 930, a display unit 940, a sensor 950, an audio circuit 960, a Wireless Fidelity (WiFi) module 970, a processor set 980 and a power supply 990. Those skilled in the art should know that the structure of the mobile phone shown in FIG. 5 is not intended to limit the mobile phone and may include components more or fewer than those shown in the figure or some components are combined or different component arrangements are adopted.

Each component of the mobile phone will be introduced below in combination with FIG. 5.

The processor set 980 is a control center of the mobile phone, and includes a processor 981 and an AI module 982. The processor 981 is coupled to the AI module 982. The processor 981 and the AI module 982 connect each part of the mobile phone by use of various interfaces and lines, and execute various functions and data processing of the mobile phone by running or executing a software program and/or module stored in the memory 920 and calling data stored in the memory 920, thereby monitoring the entire mobile phone. The processor 981 and the AI module 982 may be configured to execute the following operations.

The processor 981 is configured to, in response to detecting a starting instruction for a first application, send a first instruction containing an application identifier of the first application to the AI module 982. The AI module 982 is configured to receive the first instruction and, in response to finding out that a disabled function set includes at least one first function of the first application, send a second instruction containing a function identifier of the at least one first function to the processor 981. The processor 981 is further configured to receive the second instruction and run one or more functions, except the at least one first function, in multiple functions of the first application.

Optionally, the processor 981 and the AI module 982 may include one or more processing units. As an exemplary implementation, the processor 981 may integrate an application processor and a modulation and demodulation processor. The application processor mainly processes an operating system, a user interface, an application program and the like. The modulation and demodulation processor mainly processes wireless communication. It can be understood that the modulation and demodulation processor may also not be integrated into the processor 981.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with, a network and another device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store a software program and a module. The processor 981 and the AI module 982 operate the software program and module stored in the memory 920, thereby executing various function applications and data processing of the mobile phone. The memory 920 may mainly include a program storage region and a data storage region. The program storage region may store the operating system, the application program required by at least one function and the like. The data storage region may store data created according to use of the mobile phone (for example, a using parameter of an application) and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. In some implementations, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. In some implementations, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 5, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and another sensor. In some implementations, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960 includes a speaker 961, and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, For example, another mobile phone through the RF circuit 910, or the audio data is played to the memory 920 for further processing.

WiFi is a short-distance wireless transmission technology. The mobile phone may help the user through the WiFi module 970 to receive and send an electronic mail, browse a webpage, access streaming media and the like, and wireless wideband Internet access is provided for the user. Although the WiFi module 970 is shown in FIG. 5, it can be understood that it is not a necessary composition of the mobile phone and may completely be omitted according to a requirement without changing the scope of the essence of the present disclosure.

The mobile phone may further include a power supply 990 supplying power to each part. As an exemplary implementation, the power supply may be logically coupled to the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiment shown in FIG. 2A, the flow in each operation of the method may be implemented based on the structure of the mobile phone.

In the embodiment shown in FIG. 4, each functional unit may be implemented based on the structure of the mobile phone.

An embodiment of the present disclosure also provides a computer-readable storage medium, which stores a computer program configured for electronic data exchange, the computer program enabling a computer to execute part or all of the operations of any method recorded in the method embodiment and the computer including a mobile terminal.

An embodiment of the present disclosure also provides a computer program product. The computer program product includes a non-transitory computer-readable storage medium storing a computer program. The computer program may be operated to enable a computer to execute part or all of the operations of any method recorded in the method embodiment. The computer program product may be a software installation package, and the computer includes a mobile terminal.

It is to be noted that, for simple description, each method embodiment is expressed as a combination of a series of actions. However, those skilled in the art should know that the present disclosure is not limited to a described action sequence because some operations may be executed in another sequence or at the same time according to the present disclosure. Second, those skilled in the art should also know that all the embodiments described in the specification are exemplary embodiments and involved actions and modules are optional for the present disclosure.

Each embodiment in the embodiments is described with different particular emphases, and parts which are not elaborated in a certain embodiment may refer to related descriptions of the other embodiments.

In some embodiments provided by the application, it should be understood that the disclosed device may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit. The integrated unit may be implemented in a hardware form, and may also be implemented in form of software functional unit.

When being implemented in form of software functional unit and sold or used as an independent product, the integrated unit may be stored in a computer-readable memory. Based on such an understanding, the technical solutions of the present disclosure substantially or parts making contributions to the related art or all or part of the technical solutions may be embodied in form of software product, and the computer software product is stored in a memory, including a plurality of instructions configured to enable a computer device (which may be a personal computer, a server, a network device or the like) to execute all or part of the operations of the method in each embodiment of the present disclosure. The memory includes: various media capable of storing program codes such as a U disk, a mobile hard disk, a Read-Only Memory (ROM), a RAM, a mobile hard disk, a magnetic disk or an optical disk.

Those of ordinary skill in the art may understand that all or part of the operations in each method of the embodiments may be completed by instructing, through a program, related hardware, the program may be stored in a computer-readable memory, and the memory may include a flash disk, a ROM, a RAM, a magnetic disk, an optical disk or the like.

The embodiments of the present disclosure are introduced above in detail. The principle and implementation modes of the present disclosure are elaborated in the specification with embodiments and examples. The embodiments are described above only to help the method of the present disclosure and the core concept thereof to be understood. In addition, those skilled in the art may make variations to the exemplary implementation modes and the scope of application according to the concept of the present disclosure. To sum up, the contents of the specification should not be understood as limits to the present disclosure.

What is claimed is:

1. A mobile terminal, comprising a universal processor, configured to:
   in response to detecting a starting instruction for a first application, generate a first instruction containing an application identifier of the first application;
   in response to finding out according to the first instruction that a disabled function set comprises at least one first function of the first application, generate a second instruction containing a function identifier of the at least one first function; and
   running, according to the second instruction, one or more functions, except the at least one first function, in multiple functions of the first application.

2. The mobile terminal as claimed in claim 1, wherein the universal processor is further configured to collect statistics on using parameters of the multiple functions of the first application within a preset time period, and is configured to acquire at least one first function of which the using parameter is smaller than a preset parameter threshold value in the multiple functions of the first application, and add the at least one first function of the first application into the disabled function set.

3. The mobile terminal as claimed in claim 1, wherein the universal processor comprises an application processor and an Artificial Intelligence (AI) module, the AI module is integrated into the application processor, and the AI module is configured to execute any operation executed by the universal processor.

4. The mobile terminal as claimed in claim 1, wherein the universal processor comprises the application processor and the AI module, the AI module is arranged independent of the application processor, and the AI module is configured to execute any operation executed by the universal processor.

5. The mobile terminal as claimed in claim 1, wherein the universal processor is further configured to:
   display a function setting interface, the function setting interface comprising a first function navigation region configured to display functions of an application, an application selection component, a function disabling component and a second function navigation region configured to display at least one disabled function;
   in response to detecting that a user selects, through the application selection component, the first application, display the multiple functions of the first application in the first function navigation region and display at least one disabled function in the multiple functions of the first application in the second function navigation region; and
   in response to detecting that the user disables, through the function disabling component, at least one first function in the first function navigation region, display the at least one first function in the second function navigation region and add the at least one first function of the first application into the disabled function set.

6. The mobile terminal as claimed in claim 5, wherein the function setting interface further comprises a function enabling component, and the universal processor is further configured to:
   in response to detecting that the user selects, through the application selection component, a second application, display multiple functions of the second application in the first function navigation region and display at least one disabled function in the multiple functions of the second application in the second function navigation region, the at least one disabled function comprising a second function; and
   in response to detecting that the user enables, through the function enabling component, the second function in the first function navigation region, remove the second function displayed in the second function navigation function and delete the second function of the second application from the disabled function set.

7. The mobile terminal as claimed in claim 1, wherein the universal processor is further configured to:
   display an application interface of the first application, the application interface comprising at least one function and the at least one function belonging to the one or more functions, except the at least one first function, in the multiple functions of the first application.

8. The mobile terminal as claimed in claim 1, wherein the universal processor comprises: a processor and an Artificial Intelligence (AI) module, the processor being coupled to the AI module, wherein
   the processor is configured to, in response to detecting the starting instruction for the first application, send the first instruction containing the application identifier of the first application to the AI module;
   the AI module is configured to receive the first instruction and, in response to finding out that the disabled function set comprises at least one first function of the first application, send the second instruction containing the function identifier of the at least one first function to the processor; and
   the processor is further configured to receive the second instruction and run one or more functions, except the at least one first function, in the multiple functions of the first application.

9. The mobile terminal as claimed in claim 8, wherein
   the processor is further configured to display a function setting interface, the function setting interface comprising a first function navigation region configured to display functions of an application, an application selection component, a function disabling component and a second function navigation region configured to display at least one disabled function; the processor is further configured to, in response to detecting that a user selects, through the application selection component, the first application, display the multiple functions of the first application in the first function navigation region and display at least one disabled function in the multiple functions of the first application in the second function navigation region; and the processor is further configured to, in response to detecting that the user disables, through the function disabling component, at least one first function in the first function navigation region, display the at least one first function in the second function navigation region and send a third instruction containing the function identifier of the at least one first function to the AI module; and
   the AI module is further configured to receive the third instruction and add the at least one first function of the first application into the disabled function set.

10. An application function control method, applied to a mobile terminal and comprising:
    generating, in response to detecting a starting instruction for a first application, a first instruction containing an application identifier of the first application;
    generating, in response to finding out according to the first instruction that a disabled function set comprises at least one first function of the first application, a second instruction containing a function identifier of the at least one first function; and
    running, according to the second instruction, one or more functions in multiple functions of the first application other than the at least one first function.

11. The application function control method as claimed in claim 10, further comprising:
    collecting statistics on using parameters of the multiple functions of the first application within a preset time period;
    acquiring at least one first function of which the using parameter is smaller than a preset parameter threshold value in the multiple functions of the first application, and adding the at least one first function of the first application into the disabled function set.

12. The application function control method as claimed in claim 11, wherein the application function control method is applied to the mobile terminal comprising a processor and an Artificial Intelligence (AI) module,
    collecting statistics on using parameters of the multiple functions of the first application within a preset time period comprises: controlling, by the mobile terminal, the AI module to collect statistics on the using parameters of the multiple functions of the first application within the preset time period;
    acquiring at least one first function of which the using parameter is smaller than a preset parameter threshold value in the multiple functions of the first application, and adding the at least one first function of the first application into the disabled function set comprises: controlling, by the mobile terminal, the AI module to acquire at least one first function of which the using parameter is smaller than the preset parameter threshold value in the multiple functions of the first application, and add the at least one first function of the first application into the disabled function set.

13. The application function control method as claimed in claim 10, further comprising:
displaying a function setting interface, the function setting interface comprising a first function navigation region configured to display functions of an application, an application selection component, a function disabling component and a second function navigation region configured to display at least one disabled function;
in response to detecting that a user selects, through the application selection component, the first application, displaying the multiple functions of the first application in the first function navigation region and displaying at least one disabled function in the multiple functions of the first application in the second function navigation region; and
in response to detecting that the user disables, through the function disabling component, at least one first function in the first function navigation region, displaying the at least one first function in the second function navigation region and adding the at least one first function of the first application into the disabled function set.

14. The application function control method as claimed in claim 13, wherein the function setting interface further comprises a function enabling component, and the application function control method further comprises:
in response to detecting that the user selects, through the application selection component, a second application, displaying multiple functions of the second application in the first function navigation region and displaying at least one disabled function in the multiple functions of the second application in the second function navigation region, the at least one disabled function comprising a second function;
in response to detecting that the user enables, through the function enabling component, the second function in the first function navigation region, removing the second function displayed in the second function navigation function and deleting the second function of the second application from the disabled function set.

15. The application function control method as claimed in claim 14, wherein the application function control method is applied to the mobile terminal comprising a processor and an Artificial Intelligence (AI) module,
in response to detecting that the user selects, through the application selection component, a second application, displaying multiple functions of the second application in the first function navigation region and displaying at least one disabled function in the multiple functions of the second application in the second function navigation region comprises: controlling, by the mobile terminal, the processor to, in response to detecting that the user selects, through the application selection component, the second application, display multiple functions of the second application in the first function navigation region and display at least one disabled function in the multiple functions of the second application in the second function navigation region;
in response to detecting that the user enables, through the function enabling component, the second function in the first function navigation region, removing the second function displayed in the second function navigation function and deleting the second function of the second application from the disabled function set comprises: controlling, by the mobile terminal, the processor to, in response to detecting that the user enables, through the function enabling component, the second function in the first function navigation region, remove the second function displayed in the second function navigation function and send a fourth instruction containing a function identifier of the second function to the AI module; and controlling, by the mobile terminal, the AI module to receive the fourth instruction and delete the second function of the second application from the disabled function set.

16. The application function control method as claimed in claim 13, wherein the application function control method is applied to the mobile terminal comprising a processor and an Artificial Intelligence (AI) module,
displaying a function setting interface comprises: controlling, by the mobile terminal, the processor to display the function setting interface;
in response to detecting that a user selects, through the application selection component, the first application, displaying the multiple functions of the first application in the first function navigation region and displaying at least one disabled function in the multiple functions of the first application in the second function navigation region comprises: controlling, by the mobile terminal, the processor to, in response to detecting that the user selects, through the application selection component, the first application, display the multiple functions of the first application in the first function navigation region and display at least one disabled function in the multiple functions of the first application in the second function navigation region; and
in response to detecting that the user disables, through the function disabling component, at least one first function in the first function navigation region, displaying the at least one first function in the second function navigation region and adding the at least one first function of the first application into the disabled function set comprises: controlling, by the mobile terminal, the processor to, in response to detecting that the user disables, through the function disabling component, at least one first function in the first function navigation region, display the at least one first function in the second function navigation region and send a third instruction containing the function identifier of the at least one first function to the AI module; and controlling, by the mobile terminal, the AI module to receive the third instruction and add the at least one first function of the first application into the disabled function set.

17. The application function control method as claimed in claim 10, wherein after running the one or more functions, except the at least one first function, in the multiple functions of the first application, the application function control method further comprises:
displaying an application interface of the first application, the application interface comprising at least one function and the at least one function belonging to the one or more functions, except the at least one first function, in the multiple functions of the first application.

18. The application function control method as claimed in claim 17, wherein the application function control method is applied to the mobile terminal comprising a processor and an Artificial Intelligence (AI) module,
displaying an application interface of the first application comprises: controlling, by the mobile terminal, the processor to display the application interface of the first application.

19. The application function control method as claimed in claim 10, wherein the application function control method is applied to the mobile terminal comprising a processor and an Artificial Intelligence (AI) module, generating, in response to detecting a starting instruction for a first application, a first instruction containing an application identifier of the first application comprises: controlling, by the mobile terminal, the processor to, in response to detecting the starting instruction for the first application, send the first instruction containing the application identifier of the first application to the AI module;

generating, in response to finding out according to the first instruction that a disabled function set comprises at least one first function of the first application, a second instruction containing a function identifier of the at least one first function comprises: controlling, by the mobile terminal, the AI module to receive the first instruction and, in response to finding out that the disabled function set comprises at least one first function of the first application, send the second instruction containing the function identifier of the at least one first function to the processor; and running, according to the second instruction, one or more functions in multiple functions of the first application other than the at least one first function comprises: controlling, by the mobile terminal, the processor to receive the second instruction and run one or more functions, except the at least one first function, in multiple functions of the first application.

20. A non-transitory computer-readable storage medium, storing a computer program configured for electronic data exchange, wherein the computer program enables a computer to execute the method as claimed in claim 10, and the computer comprises a mobile terminal.

* * * * *

UNITED STATES PATENT AND TRADEMARK OFFICE
CERTIFICATE OF CORRECTION

PATENT NO. : 10,922,131 B2  
APPLICATION NO. : 16/616936  
DATED : February 16, 2021  
INVENTOR(S) : Jian Bai Page 1 of 1

It is certified that error appears in the above-identified patent and that said Letters Patent is hereby corrected as shown below:

On the Title Page

Item (71) Applicant Line 3:  
Delete "Guangdong (CN)"  
Insert --Dongguan, Guangdong (CN)--

Item (73) Assignee Line 3:  
Delete "Guangdong (CN)"  
Insert --Dongguan, Guangdong (CN)--

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*